(12) United States Patent
Kawarabayashi et al.

(10) Patent No.: US 9,747,114 B2
(45) Date of Patent: Aug. 29, 2017

(54) INFORMATION PROCESSING APPARATUS, BOOT UP METHOD, AND COMPUTER-READABLE STORAGE MEDIUM STORING BOOT UP PROGRAM

(71) Applicant: FUJITSU LIMITED, Kawasaki-shi, Kanagawa (JP)

(72) Inventors: Minoru Kawarabayashi, Kawasaki (JP); Makoto Kozawa, Yokohama (JP); Yusuke Kudo, Kawasaki (JP); Juntaro Minezaki, Chofu (JP); Masakazu Yabe, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 206 days.

(21) Appl. No.: 14/482,294

(22) Filed: Sep. 10, 2014

(65) Prior Publication Data
US 2015/0127931 A1    May 7, 2015

(30) Foreign Application Priority Data

Nov. 1, 2013 (JP) .................................. 2013-228771

(51) Int. Cl.
G06F 9/44    (2006.01)

(52) U.S. Cl.
CPC .......... G06F 9/4405 (2013.01); G06F 9/4406 (2013.01)

(58) Field of Classification Search
CPC .... G06F 9/4401; G06F 9/4403; G06F 9/4405; G06F 9/4406
See application file for complete search history.

(56) References Cited

U.S. PATENT DOCUMENTS

| 6,336,185 | B1 * | 1/2002 | Sargenti, Jr. | G06F 9/4405 713/1 |
| 6,463,550 | B1 * | 10/2002 | Cepulis | G06F 11/006 714/25 |
| 2009/0083528 | A1 * | 3/2009 | Li | G06F 15/177 713/1 |
| 2011/0126209 | A1 | 5/2011 | Housty | |
| 2011/0231640 | A1 * | 9/2011 | Avadhanam | G06F 9/4403 713/2 |
| 2013/0097412 | A1 * | 4/2013 | Dasari | G06F 9/4405 713/2 |

FOREIGN PATENT DOCUMENTS

| JP | 64-002149 | 1/1989 |
| JP | 04-195230 | 7/1992 |
| JP | 07-319816 | 12/1995 |
| JP | 11-338838 | 12/1999 |
| JP | 2009-129101 | 6/2009 |
| WO | WO 00/17750 A1 | 3/2000 |

OTHER PUBLICATIONS

Extended European Search Report mailed Mar. 10, 2015 for corresponding European Patent Application No. 14184561.0.

\* cited by examiner

*Primary Examiner* — Thomas Lee
*Assistant Examiner* — Chad Erdman
(74) *Attorney, Agent, or Firm* — Staas & Halsey LLP (57) ABSTRACT

A SBSP writes a log into a spad in a log processor and the writing of the log from the spad to a serial port is performed by the log processor. When initialization of a main memory has been completed, the log processor temporarily writes the data read from the spad into a logmem and then clears the spad. Furthermore, when an output of the log performed by the log processor has been completed, the SBSP adds, in cooperation with the BIOS and the OS, the log processor and the logmem as the resources.

6 Claims, 8 Drawing Sheets

(a) ROM (b) STORAGE

INFORMATION PROCESSING APPARATUS, BOOT UP METHOD, AND COMPUTER-READABLE STORAGE MEDIUM STORING BOOT UP PROGRAM

CROSS-REFERENCE TO RELATED APPLICATION(S)

This application is based upon and claims the benefit of priority of the prior Japanese Patent Application No. 2013-228771, filed on Nov. 1, 2013, the entire contents of which are incorporated herein by reference.

FIELD

The embodiment discussed herein is directed to an information processing apparatus, a boot up method, and a computer-readable storage medium storing a boot up program.

BACKGROUND

In a BIOS boot up process performed in an information processing apparatus that includes multiple processors, a representative processor, i.e., a System Boot Strap Processor (SBSP), in the information processing apparatus sequentially performs an initialization process on hardware and an log (character string information) output process of outputting logs to a serial port. When the BIOS boot up process has been completed, the information processing apparatus gives resource information on a processor, a main memory, a device, or the like included in the information processing apparatus to an operating system (OS) and executes a boot up process on the OS.

In the BIOS boot up process, the SBSP performs most of the processes. During this time, application processors (APs) that are all of the other processors than the SBSP wait without processing anything until a processing request is sent from the SBSP.

Log outputs to the serial port are performed at 115 kbps (kilobits/sec), which greatly differs from the operation speed (2 GHz or more) of the processors. Consequently, a waiting time for the serial port frequently occurs during the BIOS boot up process. When the information processing apparatus is booted up, because only the SBSP outputs a log to the serial port while performing the BIOS boot up process, such as hardware initialization, booting up of the OS is delayed by the time corresponding to the waiting time for the serial port. In contrast, if an amount of logs is reduced in order to speed up booting up the OS, log information that is needed for analysis when a problem occurs in the information processing apparatus becomes insufficient.

As a conventional technology related to log collection or log processing, there is a technology in which, in a CPU that includes multiple processor cores, one of the processor cores is used as a failure process processor core that collects or records failure information (for example, Japanese Laid-open Patent Publication No. 2009-129101). Furthermore, there is also a CPU system that includes a common RAM, on a system bus, which a main CPU can simultaneously write in and read from logging information stored in the main storage and that includes a sub CPU that transfers data in the common RAM to a nonvolatile memory (for example, Japanese Laid-open Patent Publication No. 07-319816).

Furthermore, there is a conventional technology that reduces, in a multiple processor system, the time taken to acquire failure information by performing, using multiple processors in parallel, acquisition of the failure information at the time of the occurrence of a failure (for example, Japanese Laid-open Patent Publication No. 11-338838). Furthermore, there is a conventional technology that gives a log buffer acquired from a pool in response to an acquisition request of the log buffer to a request source, and that returns, in response to a release request of the log buffer, an extended memory that is associated with an extended log buffer back to the memory and a log buffer back to the pool (for example, Japanese Laid-open Patent Publication No. 01-2149).

Furthermore, there is a conventional technology that outputs failure information to an auxiliary storage unit on the basis of a failure code log buffer that accumulates failure codes each of which is associated with the type of failure that has occurred and a failure log information table that stores therein failure log information (for example, Japanese Laid-open Patent Publication No. 04-195230).

Although a tradeoff occurs between the boot up time of an OS and the amount of log information to be output, a BIOS in which an amount of log information is reduced by giving priority to the boot up time of the OS is usually used. Consequently, there is a problem in that, if a failure occurs at the time of booting up the OS, it takes time to investigate the failure because log analysis needs to be performed by switching to a BIOS in which the amount of log information is increased and reproducing the failure.

Furthermore, in a case of a failure that is not frequently occurs, the failure may sometimes be not able to be reproduced even if a reproduction environment is prepared. Furthermore, if a failure that depends on a timing occurs, the failure itself may not possibly occur in the reproduction environment due to variation in the BIOS processing time.

SUMMARY

According to an aspect of an embodiment, an information processing apparatus includes multiple processors including a first processor that performs an initialization process on hardware and that creates a log at the time of boot up; and a second processor that performs an output process of outputting the log created by the first processor by using a dedicated memory area in a main memory, wherein when the output of the log has been completed, a hot-add operation is performed on the second processor and the dedicated memory area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A preferred embodiment of the present invention will be explained with reference to accompanying drawings. The disclosed technology is not limited to the embodiment.

Embodiment

Figure 1:
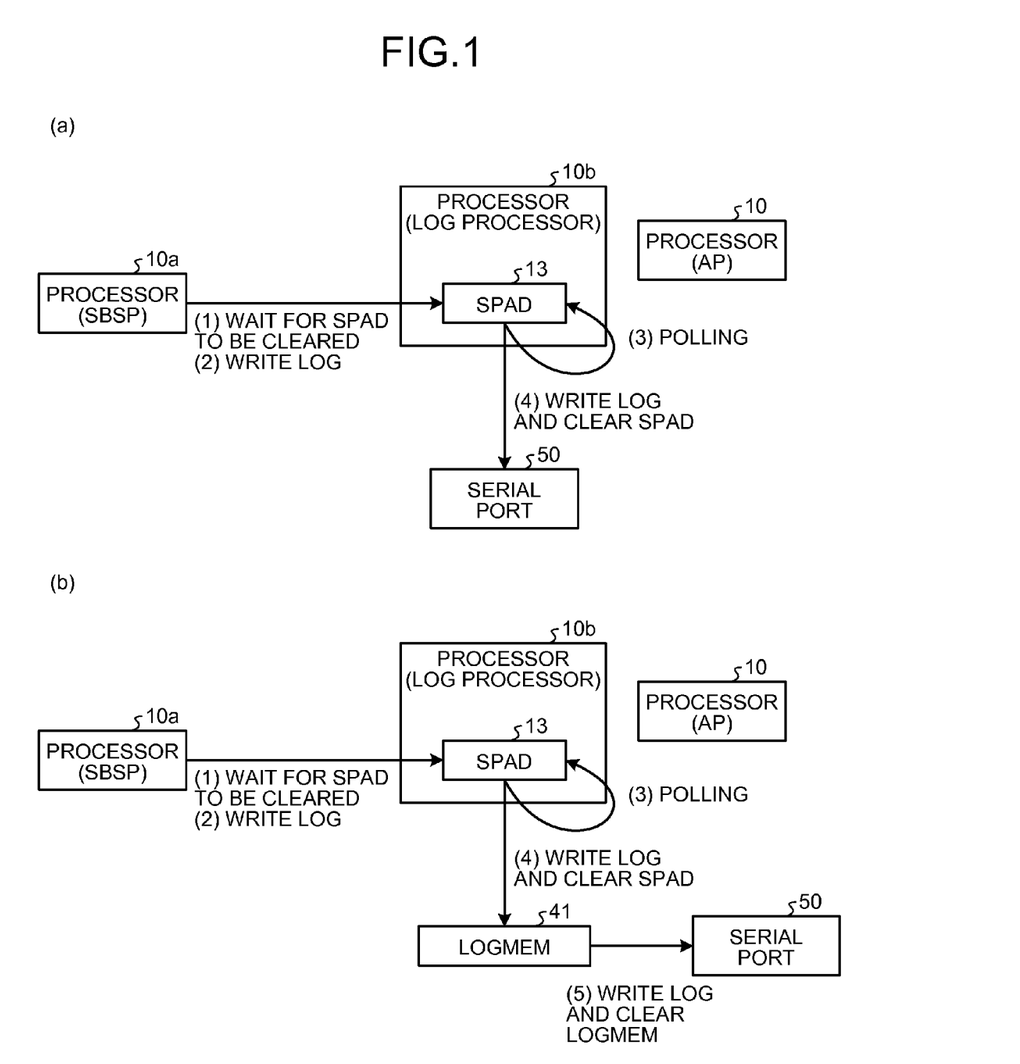
FIG. 1 is a schematic diagram illustrating a logging method performed by an information processing apparatus according to an embodiment.

First, a description will be given of a logging method performed by an information processing apparatus according to an embodiment. FIG. 1 is a schematic diagram illustrating a logging method performed by an information processing apparatus according to an embodiment. FIG. 1(*a*) indicates a logging method performed before main memory initialization and FIG. 1(*b*) indicates a logging method performed after the main memory initialization.

In the logging method according to the embodiment, a processor from among processors 10 other than a SBSP 10*a* operates as a log processor 10*b* dedicated to a log process. The other processors 10 than the SBSP 10*a* and the log processor 10*b* operate as application processors APs.

As illustrated in FIG. 1(*a*), before the main memory is initialized, the SBSP 10*a* waits for a state in which a scratchpad register (spad) 13 included in the log processor 10*b* is cleared (1). When the spad 13 has been cleared, the SBSP 10*a* writes a log into the spad 13 (2). In this case, the spad 13 is a register that can be used, in a processor, as a working auxiliary memory that is used to temporarily store data by a program.

The log processor 10*b* polls the spad 13 (3) and, when the log is written into the spad 13, the log processor 10*b* writes the log out to a serial port 50 and then clears the spad 13 (4).

Thereafter, if the initialization of the main memory has been completed by the BIOS, as illustrated in FIG. 1(*b*), the SBSP 10*a* waits for the state in which the spad 13 included in the log processor 10*b* is cleared (1). When the spad 13 has been cleared, the SBSP 10*a* writes a log into the spad 13 (2).

The log processor 10*b* polls the spad 13(3) and, when the log is written into the spad 13, the log processor 10*b* writes the log into a logmem 41 and then clears the spad 13 (4). In this case, the logmem 41 is a memory dedicated to storing a log at the time of booting up and is a part of the main memory. If a log is present in the logmem 41, the log processor 10*b* writes the log out to the serial port 50 and then clears the logmem 41 (5).

As described above, in the logging method according to the embodiment, the SBSP 10*a* writes a log into the spad 13 in the log processor 10*b* without writing the log out to the serial port 50. Furthermore, after the initialization of the main memory, the log processor 10*b* writes the log into the logmem 41 and then clears the spad 13.

Accordingly, the SBSP 10*a* can perform a boot up process on an OS without waiting a state in which the serial port can be used. Consequently, when compared with the conventional method, the information processing apparatus can perform the boot up process of an OS at a high speed without suppressing log outputs.

Figure 2:
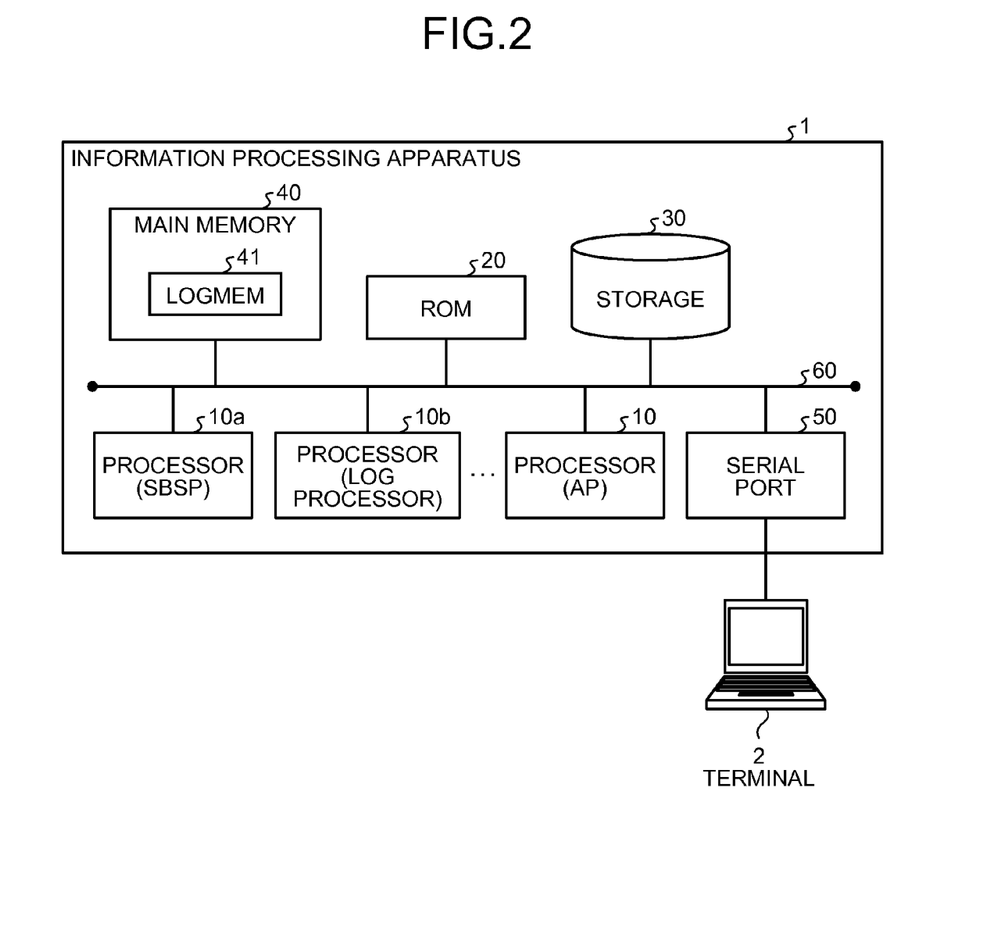
FIG. 2 is a schematic diagram illustrating the configuration of the information processing apparatus according to the embodiment.

In the following, a description will be given of the configuration of the information processing apparatus according to the embodiment. FIG. 2 is a schematic diagram illustrating the configuration of the information processing apparatus according to the embodiment. As illustrated in FIG. 2, an information processing apparatus 1 includes multiple processors 10, a read only memory (ROM) 20, storage 30, a main memory 40, and the serial port 50.

The multiple processors 10 includes the processors 10 operating as the SBSP 10*a* and the log processor 10*b*. For convenience of description, FIG. 2 illustrates only three processors 10 including the SBSP 10*a* and the log processor 10*b* as the multiple processors 10. However, the information processing apparatus 1 can include an arbitrary number of processors 10. The multiple processors 10, the ROM 20, the storage 30, the main memory 40, and the serial port 50 are connected by a system bus 60.

The processor 10 is a processing unit that reads and executes a program stored in the ROM 20 or the main memory 40. The ROM 20 is a read-only memory that stores a program, such as the BIOS, that is needed for initialization.

The storage 30 is a nonvolatile storage device, such as a hard disk drive (HDD), a solid state drive (SSD), or the like, that stores therein data. An OS and application programs are installed in the storage 30. The OS and the application programs are read into the main memory 40 and then executed.

The main memory 40 is a random access memory (RAM) that stores therein a program that is read from the ROM 20 or the storage 30 and mid-results of processing. A part of the main memory 40 is used as the logmem 41.

The serial port 50 is a port that is connected to a serial interface and that is connected to a terminal 2 via the serial interface. The log written out to the serial port 50 is displayed on a display device of the terminal 2.

Figure 3:
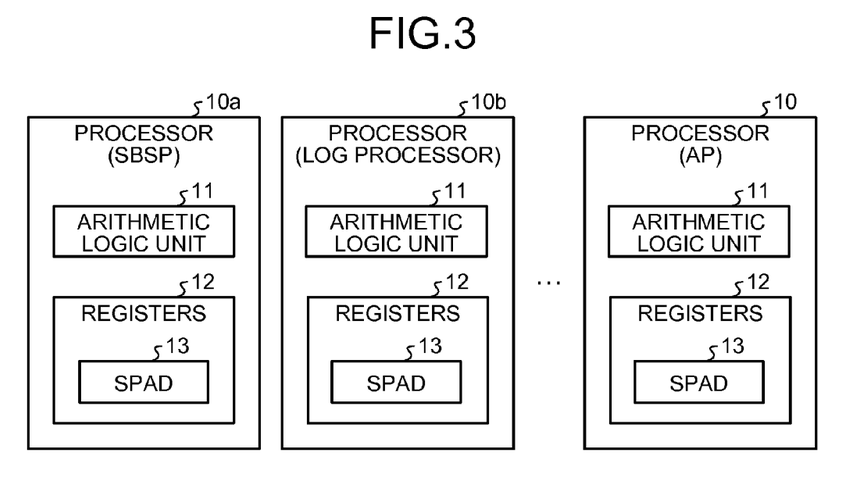
FIG. 3 is a schematic diagram illustrating the configuration of processors.

FIG. 3 is a schematic diagram illustrating the configuration of processors 10. As illustrated in FIG. 3, each of the processors 10, including the SBSP 10*a* and the log processor 10*b*, includes an arithmetic logic unit 11 and registers 12.

The arithmetic logic unit 11 reads an instruction code stored in the main memory 40, analyzes the instruction code, and executes the code. Each of the registers 12 is an area that retains various kinds of information on the processors 10. Each of the registers 12 includes the spad 13.

Figure 4:
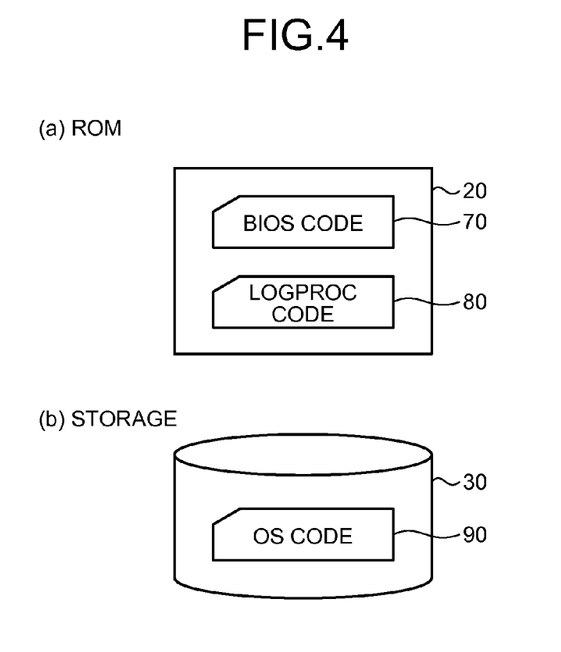
FIG. 4 is a schematic diagram illustrating programs stored in a ROM and a storage.

FIG. 4 is a schematic diagram illustrating programs stored in the ROM 20 and the storage 30. FIG. 4(*a*) indicates the programs stored in the ROM 20 and FIG. 4(*b*) indicates the program stored in the storage 30.

As illustrated in FIG. 4(*a*), a BIOS code 70 and a logproc code 80 are stored in the ROM 20. The BIOS code 70 initializes the information processing apparatus 1 and makes the information processing apparatus 1 available for a use. The logproc code 80 is a program that is used by the log processor 10*b* to perform a log output process.

As illustrated in FIG. 4(*b*), an OS code 90 is stored in the storage 30. The BIOS code 70, the logproc code 80, and the OS code 90 are read from the ROM 20 and the storage 30 by the process performed by the BIOS and the OS and are loaded in the main memory 40.

Figure 5:
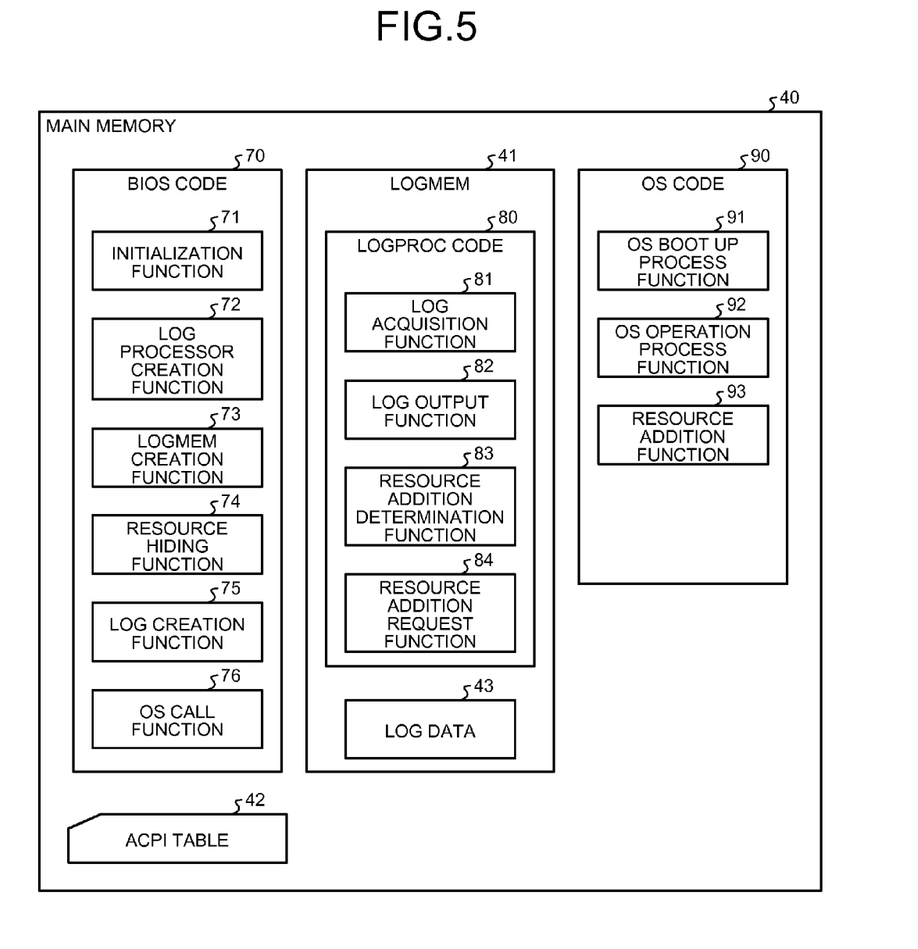
FIG. 5 is a schematic diagram illustrating program codes loaded in a main memory.

FIG. 5 is a schematic diagram illustrating program codes loaded in the main memory 40. As illustrated in FIG. 5, the BIOS code 70 has an initialization function 71, a log processor creation function 72, a logmem creation function 73, a resource hiding function 74, a log creation function 75, and an OS call function 76.

The initialization function 71 is a function that initializes physical resources in the information processing apparatus 1 and that allows the OS to be in a state in which the OS can be booted up. The log processor creation function 72 is a function that boots up one of the Aps as the log processor 10b dedicated to the log process. The logmem creation function 73 is a function that reserves, in the main memory 40, the logmem 41 dedicated to a memory area that is used for a log output process.

In a BIOS boot up process, the SBSP 10a reserves a part of the main memory 40 as the logmem 41, reserves one of the Aps in the information processing apparatus 1 as the log processor 10b, and then performs initialization, with priority, in order to perform the log output process. In the initialization process, the log processor 10b reserves the spad 13 from the registers 12 included its own processor and prepares for the writing of a log received from the SBSP 10a.

The logmem 41 is divided into two areas, i.e., a code area and a data area. In the code area, the logproc code 80 is loaded from the ROM 20. In the data area, actual log data 43 is written. Unlike a usual main memory area, even if the BIOS has completed the boot up process and gives control to the OS, the logmem 41 is not placed under the control of the OS until the log output process has been completed.

The resource hiding function 74 is a function that performs a process of temporarily hiding the main memory area that is used as the logmem 41 and hiding the log processor 10b from the OS. Because the log processor 10b and the logmem 41 need to be hidden from the OS due to the log output process even after the OS has been booted up. Because the OS recognizes the hardware resources from an Advanced Configuration and Power Interface (ACPI) table 42 created by the BIOS, the BIOS does not add the log processor 10b and the logmem 41 to the ACPI table 42 and does not give the resources to the OS.

Accordingly, the OS boots up the information processing apparatus 1 without recognizing the presence of the log processor 10b and the logmem 41 that are not described in the ACPI table 42. When the log output process has been completed, the resources that were used for the log output process are managed by the OS, without stopping the information processing apparatus 1, by a hot-add function that is a function of adding a resource.

The log creation function 75 is a function of performing a process of putting a log in the log processor 10b and the logmem 41. The SBSP 10a writes a BIOS boot up log created in each phase of the BIOS boot up process into the spad 13 in the log processor 10b. If the spad 13 is not free, the SBSP 10a waits until the spad 13 can be used.

When the last phase of the BIOS boot up process ends and control is given to the OS, the SBSP 10a adds a special boot completion identifier to a log. When the log processor 10b detects the boot completion identifier, the log processor 10b instructs the SBSP 10a such that the resources that were used in the log output process are placed under the control of the OS by using the hot-add function.

The OS call function 76 is a function of calling the OS after the information processing apparatus 1 is initialized. The boot process is performed on the OS by using the OS call function and the OS is gradually loaded in the main memory 40.

The logproc code 80 includes a log acquisition function 81, a log output function 82, a resource addition determination function 83, and a resource addition request function 84.

The log acquisition function 81 is a function of acquiring a log created by the log creation function 75 and retaining the log in the logmem 41. The log output function 82 is a function of outputting the log retained in the logmem 41 to the serial port 50.

Before the main memory 40 is initialized, the log processor 10b monitors the spad 13 by performing the polling. If any log is written from the SBSP 10a, the log processor 10b checks the state of the serial port 50. If the state indicates that the serial port 50 can be used, the log processor 10b reads the log from the spad 13, outputs the log to the serial port 50, and clears the spad 13. If the state indicates that the serial port 50 is being used, the log processor 10b waits for the log output process to be performed until the serial port 50 can be used. When the initialization of the main memory 40 has been completed, the SBSP 10a sets a flag indicating that the logmem 41 becomes available.

After the initialization of the main memory 40, the log processor 10b monitors the spad 13 by performing the polling. If any log is written from the SBSP 10a, the log processor 10b reads the log from the spad 13. If the flag is set indicating that the logmem 41 becomes available, the log processor 10b writes the log into the logmem 41 and then clears the spad 13.

Furthermore, if a log has been written in the logmem 41, the log processor 10b checks the state of the serial port 50. If the state indicates that the serial port 50 can be used, the log processor 10b outputs the log and then deletes the output log from the logmem 41. If the state indicates that the serial port 50 is being used, the log processor 10b waits for an output of the log to the serial port 50 until the serial port 50 can be used.

The resource addition determination function 83 is a function of determining whether log outputs have been completed and releasing the hiding of the log processor 10b and the logmem 41. If the log processor 10b detects a boot completion identifier in the log that was output to the serial port 50, the log processor 10b determines that all of the outputs of logs have been completed.

The resource addition request function 84 is a function of requesting the OS to add the log processor 10b and the logmem 41. If the log processor 10b determines that all of the outputs of the logs have been completed, the log processor 10b issues System Management Interrupt (SMI) and requests the SBSP 10a to add the log processor 10b and the logmem 41 as the resources of the information processing apparatus 1. In response to receiving the SMI, the SBSP 10a cooperates with an existing mechanism of the ACPI and a resource addition function 93 of the OS and adds the log processor 10b and the logmem 41 as the resources of the information processing apparatus 1.

The OS code 90 includes an OS boot up process function 91 that is used to boot up the OS and execute the OS and includes an OS operation process function 92. Furthermore, the OS code 90 includes the resource addition function 93 that is used to realize an addition of a resource.

Figure 6:
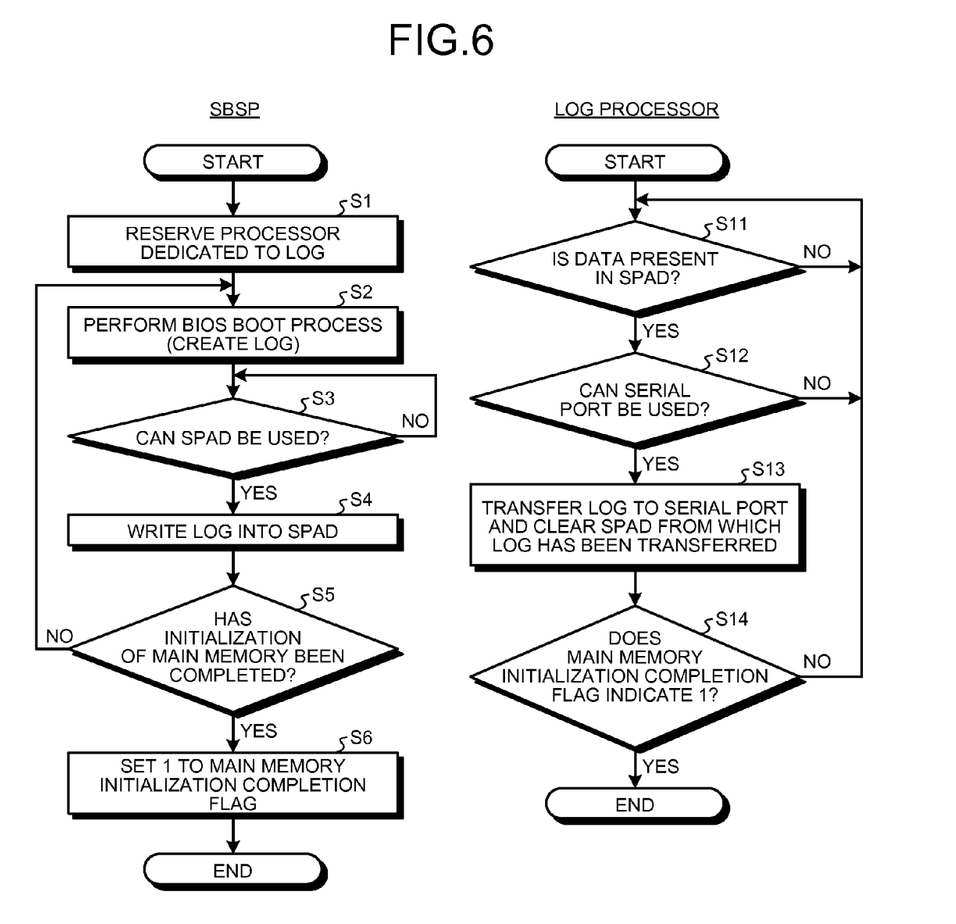
FIG. 6 is a flowchart illustrating the flow of a log output process (before main memory initialization)

In the following, a description will be given of the flow of the log output process (before the main memory initialization). FIG. 6 is a flowchart illustrating the flow of a log output process (before the main memory initialization). As illustrated in FIG. 6, the SBSP 10a reserves a processor dedicated to a log (Step S1) and performs a BIOS boot process (Step S2).

When the SBSP 10a creates a log during the BIOS boot process, the SBSP 10a determines whether the spad 13 can be used (Step S3). If the spad 13 cannot be used, the SBSP 10a waits until the spad 13 can be used.

In contrast, if the spad 13 can be used, the SBSP 10a writes the log into the spad 13 (Step S4). Then, the SBSP 10a determines whether initialization of the main memory 40 has been completed (Step S5). If initialization of the main memory 40 has not been completed, the SBSP 10a returns to Step S2 and continues the BIOS boot process. In contrast, if initialization of the main memory 40 has been completed, the SBSP 10a sets 1 to the main memory initialization completion flag (Step S6) and then proceeds to the log output process that is performed after initialization of the main memory.

The log processor 10b determines whether data is present in the spad 13 (Step S11). If no data is present, the log processor 10b waits until data is written. In contrast, if any data is present, the log processor 10b determines whether the serial port 50 can be used (Step S12). If the determination result indicates that the serial port 50 cannot be used, the log processor 10b waits until the serial port 50 can be used.

In contrast, if the serial port 50 can be used, the log processor 10b transfers a log to the serial port 50 and then clears the spad 13 from which the log has been transferred (Step S13).

Then, the log processor 10b determines whether the main memory initialization completion flag indicates 1 (Step S14). If the flag does not indicate 1, initialization of the main memory 40 has not been completed; therefore, the log processor 10b returns to Step S11. In contrast, if the main memory initialization completion flag indicates 1, the log processor 10b proceeds to the log output process that is performed after initialization of the main memory 40.

As described above, the SBSP 10a only writes a log into the spad 13 and an output of the log to the serial port 50 is performed by the log processor 10b. Consequently, the SBSP 10a can perform the BIOS boot process at a higher speed than ever before.

Figure 7:
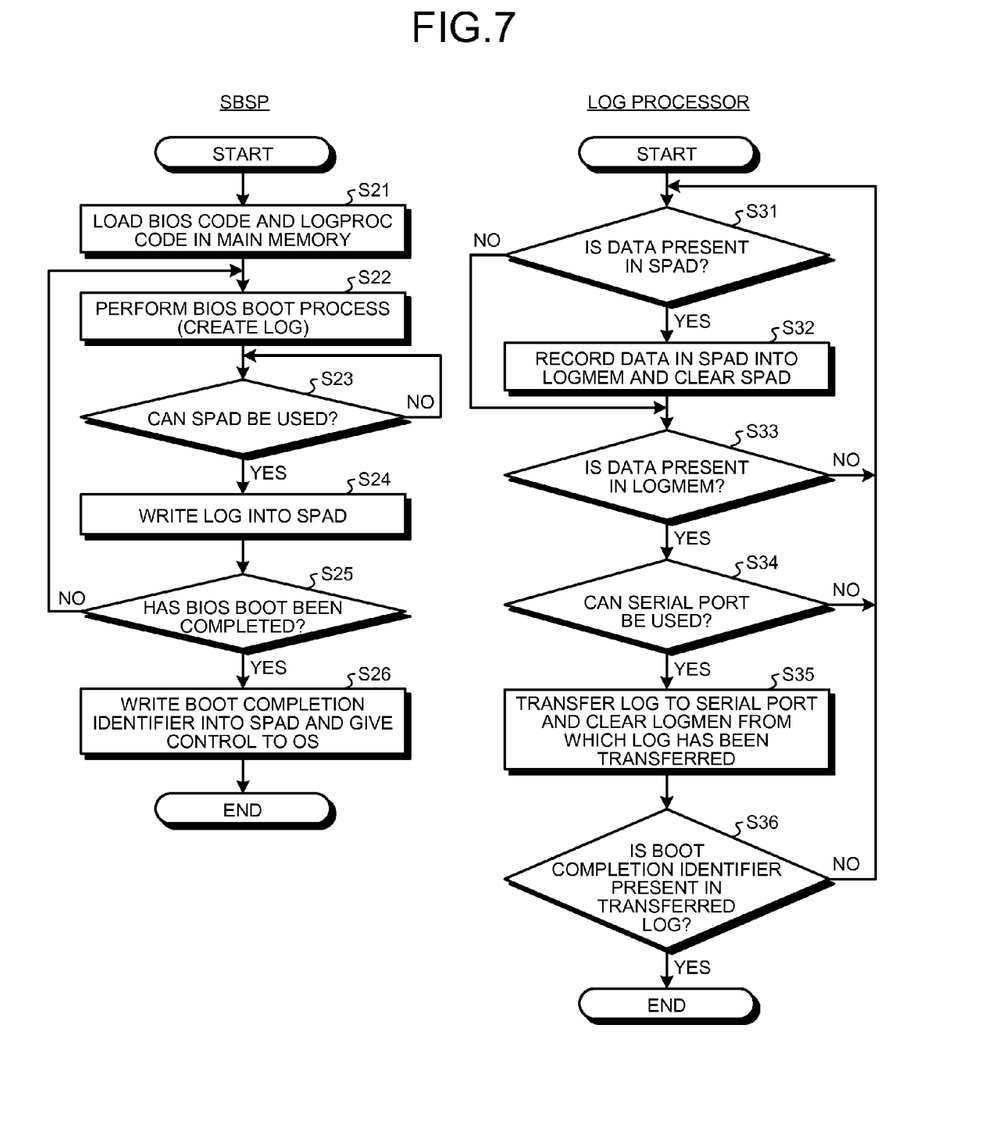
FIG. 7 is a flowchart illustrating the flow of a log output process (after the main memory initialization)

In the following, a description will be given of the flow of the log output process (after the main memory initialization). FIG. 7 is a flowchart illustrating the flow of a log output process (after the main memory initialization). As illustrated in FIG. 7, the SBSP 10a loads the BIOS code 70 and the logproc code 80 in the main memory 40 (Step S21) and continues to perform the BIOS boot process by using the BIOS code 70 that is loaded in the main memory 40 (Step S22).

When the SBSP 10a creates a log during the BIOS boot process, the SBSP 10a determines whether the spad 13 can be used (Step S23). If the spad 13 cannot be used, the SBSP 10a waits until the spad 13 can be used.

In contrast, if the spad 13 can be used, the SBSP 10a writes a log into the spad 13 (Step S24). Then, the SBSP 10a determines whether the BIOS boot has been completed (Step S25). If the BIOS boot has not been completed, the SBSP 10a returns to Step S22 and continues the BIOS boot process. In contrast, the BIOS boot has been completed, the SBSP 10a writes the boot completion identifier into the spad 13, gives control to the OS (Step S26), and then proceeds to the resource addition process.

The log processor 10b determines whether data is present in the spad 13 (Step S31). If any data is present, the log processor 10b records the data stored in the spad 13 into the logmem 41 and then clears the spad 13 (Step S32).

Then, the log processor 10b determines whether data is present in the logmem 41 (Step S33). If no data is present in the logmem 41, the log processor 10b returns to Step S31a. If any data is present in the logmem 41, the log processor 10b determines whether the serial port 50 can be used (Step S34). If the determination result indicates that the serial port 50 cannot be used, the log processor 10b waits until the serial port 50 can be used.

In contrast, if the serial port 50 can be used, the log processor 10b transfers the log to the serial port 50 and then clears the logmem 41 from which the log has been transferred (Step S35). Then, the log processor 10b determines whether a boot completion identifier is present in the transferred log (Step S36). If no boot completion identifier is present in the transferred log, the log processor 10b returns to Step S31a. If a boot completion identifier is present in the transferred log, the log processor 10b proceeds to the resource addition process.

As described above, the SBSP 10a writes a log into the spad 13 and the log processor 10b temporarily records the log into the logmem 41 and clears the spad 13. Consequently, the SBSP 10a can perform the BIOS boot process at a higher speed than that performed before initialization of the main memory.

Figure 8:
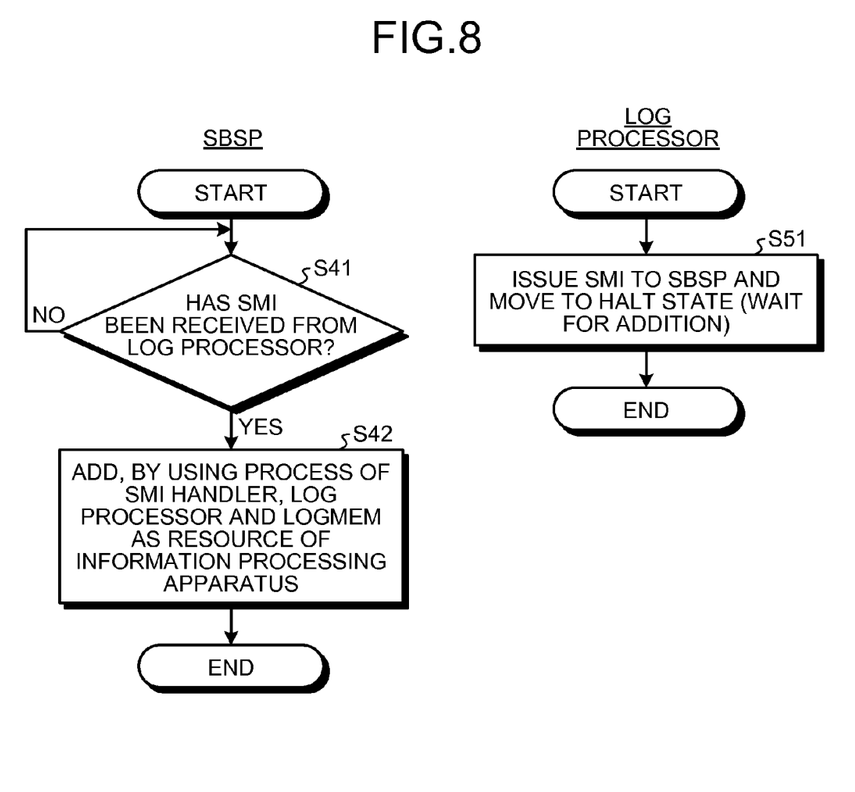
FIG. 8 is a flowchart illustrating the flow of a resource addition process.

In the following, a description will be given of the flow of the resource addition process. FIG. 8 is a flowchart illustrating the flow of a resource addition process. As illustrated in FIG. 8, the SBSP 10a determines whether the SMI has been received from the log processor 10b (Step S41). If the SMI has not been received, the SBSP 10a waits for the SMI to be received.

In contrast, if the SMI has been received from the log processor 10b, the SBSP 10a includes, by using a process of an SMI handler, the log processor 10b and the logmem 41 as the resources of the information processing apparatus 1 (Step S42).

The log processor 10b issues the SMI to the SBSP 10a, moves to a Halt state (Step S51), and waits until the log processor 10b is added as the resource of the information processing apparatus 1.

As described above, the SBSP 10a performs, by using the process of the SMI handler, a hot-add operation in which the log processor 10b and the logmem 41 are added as the resources of the information processing apparatus 1. Consequently, the log processor 10b and the logmem 41 can be used by an application or the like after the log output process that is performed at the time of booting up.

Figure 9:
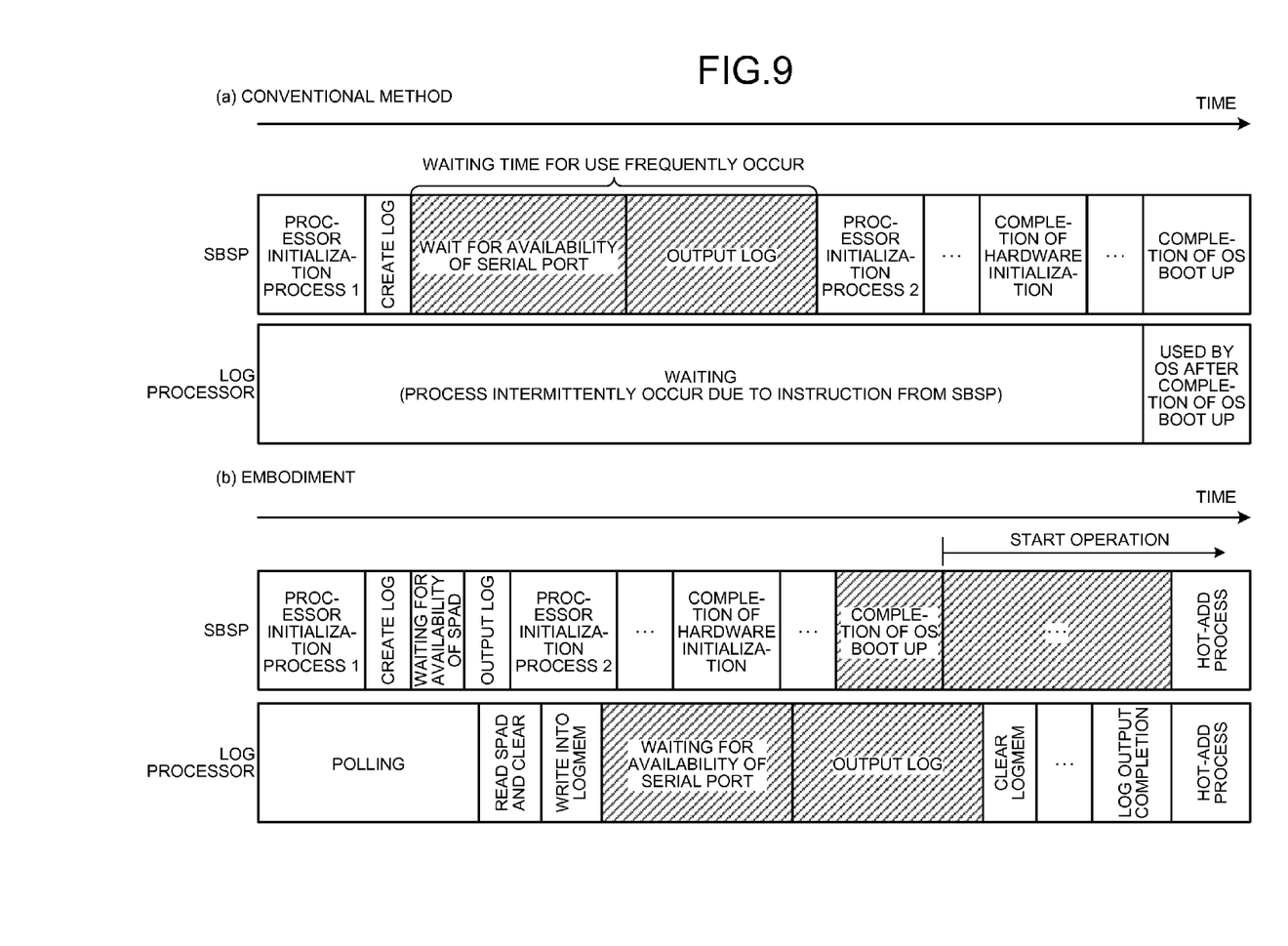
FIG. 9 is a schematic diagram illustrating an advantage of the logging method according to the embodiment.

In the following, an advantage of the logging method according to the embodiment will be described. FIG. 9 is a schematic diagram illustrating an advantage of the logging method according to the embodiment. FIG. 9(a) indicates the time elapsed until the completion of OS boot performed by using the conventional logging method. FIG. 9(b) indicates the time elapsed until the hot-add process is performed by using the logging method according to the embodiment.

As illustrated in FIG. 9(a), in the conventional logging method, only the SBSP 10a performs the initialization process and the other Aps simply intermittently perform a process in response to an instruction from the SBSP 10a. Furthermore, because the SBSP 10a directly outputs a log to the serial port 50, a waiting time for using the serial port frequently occurs and thus booting up of the OS is delayed. If log outputs are decreased, the boot up time of the OS can be reduced. However, checking is difficult when a failure occurs.

In contrast, as illustrated in FIG. 9(b), in the logging method according to the embodiment, because the SBSP 10a outputs a log to the spad 13 and a waiting time of the spad 13 is greatly shorter than that of the serial port 50, a waiting time for outputting a log can be reduced. Consequently, the SBSP 10a can promptly complete the OS boot process when compared with the conventional technology. Furthermore, the SBSP 10a can start its operation without waiting completion of an output of the log to the serial port 50.

Furthermore, because the log processor 10b selected by the AP writes the log that is written into the spad 13 into the logmem 41 and outputs the log while waiting for a use of the serial port 50, the log processor 10b continues to perform the log output process even after the SBSP 10a completes the OS boot process. Then, if the output of the log has been completed, the BIOS cooperates with the OS and adds, by using the hot-add process, the hidden logmem 41 and the log processor 10b as the resources of the information processing apparatus 1.

As described above, in the embodiment, the SBSP 10a writes a log into the spad 13 in the log processor 10b and the writing of the log from the spad 13 into the serial port 50 is performed by the log processor 10b. Furthermore, the waiting time for using the spad 13 is greatly shorter than that of the serial port 50.

Consequently, the SBSP 10a can perform the OS boot process in a short time when compared with the conventional technology. Furthermore, the SBSP 10a can start its operation during the output of a log without waiting for completion of the log output process performed by the log processor 10b.

Furthermore, in the embodiment, when initialization of the main memory 40 has been completed, the log processor 10b temporarily writes the data that was read from the spad 13 into the logmem 41 and then clears the spad 13. The time taken to write data into the logmem 41 is greatly shorter than the time taken to output data to the serial port 50.

Accordingly, the log processor 10b can read the log in the spad 13 at a higher speed after the initialization of the main memory 40, which makes it possible to reduce the waiting time of the SBSP 10a for the spad 13 being cleared.

Furthermore, in the embodiment, when an output of the log from the log processor 10b has been completed, the SBSP 10a adds, in cooperation with the BIOS and the OS, the log processor 10b and the logmem 41 as the resources. Consequently, the OS can use all of the resources in the information processing apparatus 1 and can prevent the resources from being reduced.

According to an aspect of an embodiment of the present invention, the boot up time of an OS can be reduced without limiting log outputs when an information processing apparatus is booted up.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus that includes multiple processors, the information processing apparatus comprising:
   a first processor among the multiple processors that performs an initialization process on hardware and that creates a log at the time of boot up; and
   a second processor among the multiple processors other than the first processor that performs an output process of outputting the log created by the first processor by writing a dedicated memory area that is in a main memory and dedicated to logs, the second processor operating as a log processor dedicated to a log process, wherein
   when the second processor determines that the output of the log has been completed, the first processor performs a hot-add operation, that is a function of adding a resource without stopping the information processing apparatus, the second processor and the dedicated memory area.

2. The information processing apparatus according to claim 1, wherein the first processor boots up an OS before the second processor completes the output process, places resources excluding the second processor and the dedicated memory area under the control of the OS, and includes, when the second processor completes the output process, the second processor and the dedicated memory area under the control of the OS.

3. The information processing apparatus according to claim 1, wherein
   before the first processor initializes the main memory, the second processor outputs the log to a serial port, and
   after the first processor initialized the main memory, the second processor writes the log into the dedicated memory area, reads the written log from the dedicated memory, and outputs the log to the serial port.

4. The information processing apparatus according to claim 3, wherein
   the first processor writes the log into a register in the second processor, and
   the second processor performs the output process of outputting the log by polling the register.

5. A boot up method for booting up an information processing apparatus that includes multiple processors, the boot up method comprising:
   performing, performed by a first processor among the multiple processors, an initialization process on hardware and creating a log;
   outputting, performed by a second processor among the multiple processors other than the first processor by writing a dedicated memory area that is in a main memory and dedicated to logs, the log created by the first processor at the creating, the second processor operating as a log processor dedicated to a log process; and
   performing, performed by the first processor when the second processor determines that the output of the log has been completed, a hot-add operation, that is a function of adding a resource without stopping the information processing apparatus, on the second processor and the dedicated memory area.

6. A non-transitory computer-readable recording medium having stored therein a boot up program for booting up an information processing apparatus that includes multiple processors, the boot up program causing a computer to execute a process comprising:
   performing, performed by a first processor among the multiple processors, an initialization process on hardware and creating a log;
   outputting, performed by a second processor by reading writing a dedicated memory area that is in a main memory and dedicated to logs, the log created by the first processor at the creating, the second processor operating as a log processor dedicated to a log process; and performing, performed by the first processor when the second processor determines that the output of the log has been completed, a hot-add operation, that is a function of adding a resource without stopping the information processing apparatus, on the second processor and the dedicated memory area.

* * * * *